US011518883B2

(12) United States Patent
Jia et al.

(10) Patent No.: US 11,518,883 B2
(45) Date of Patent: Dec. 6, 2022

(54) CURABLE SILICONE COMPOSITIONS

(71) Applicant: ELKEM SILICONES SHANGHAI CO., LTD., Shanghai (CN)

(72) Inventors: Liya Jia, Shanghai (CN); Jicheng Yang, Shanghai (CN); Yuanzhi Yue, Shanghai (CN)

(73) Assignee: ELKEM SILICONES SHANGHAI CO., LTD., Shanghai (CN)

( * ) Notice: Subject to any disclaimer, the term of this patent is extended or adjusted under 35 U.S.C. 154(b) by 87 days.

(21) Appl. No.: 16/475,377

(22) PCT Filed: Dec. 29, 2017

(86) PCT No.: PCT/CN2017/119650
§ 371 (c)(1),
(2) Date: Jul. 1, 2019

(87) PCT Pub. No.: WO2018/121706
PCT Pub. Date: Jul. 5, 2018

(65) Prior Publication Data
US 2020/0270454 A1   Aug. 27, 2020

(30) Foreign Application Priority Data
Dec. 30, 2016  (WO) ............... PCT/CN2016/113942

(51) Int. Cl.
*C08L 83/04* (2006.01)
*C08G 77/08* (2006.01)
*C08G 77/12* (2006.01)
*C08G 77/14* (2006.01)
*C08G 77/20* (2006.01)
*C08K 5/00* (2006.01)
*C08K 5/5435* (2006.01)
*C08K 5/56* (2006.01)

(52) U.S. Cl.
CPC .............. *C08L 83/04* (2013.01); *C08G 77/08* (2013.01); *C08G 77/12* (2013.01); *C08G 77/14* (2013.01); *C08G 77/20* (2013.01); *C08K 5/0025* (2013.01); *C08K 5/5435* (2013.01); *C08K 5/56* (2013.01); *C08L 2201/10* (2013.01); *C08L 2203/206* (2013.01); *C08L 2203/30* (2013.01)

(58) Field of Classification Search
CPC ........................................................ C08L 83/04
USPC ............................................................. 528/15
See application file for complete search history.

(56) References Cited

U.S. PATENT DOCUMENTS

| 4,087,585 A * | 5/1978 | Schulz ................... C08L 83/04 428/429 |
| 7,521,813 B2 * | 4/2009 | Kashiwagi .............. C08L 83/04 257/791 |
| 8,044,153 B2 * | 10/2011 | Yamamoto .............. C08L 83/04 525/478 |
| 8,389,650 B2 | 3/2013 | Takanashi et al. |
| 9,562,149 B2 | 2/2017 | Cray et al. |
| 10,927,256 B2 * | 2/2021 | Muramatsu ............. C08L 83/06 |
| 2003/0214051 A1 | 11/2003 | Dent et al. |
| 2005/0006794 A1 * | 1/2005 | Kashiwagi .............. C08L 83/04 257/788 |
| 2007/0032595 A1 | 2/2007 | Yamakawa et al. |
| 2009/0118441 A1 * | 5/2009 | Yamamoto .............. C08L 83/04 525/478 |
| 2010/0255205 A1 | 10/2010 | Cray et al. |
| 2011/0077344 A1 * | 3/2011 | Hasegawa .............. C08L 83/04 524/500 |
| 2013/0161686 A1 | 6/2013 | Yoshitake et al. |
| 2013/0186564 A1 * | 7/2013 | Keller ..................... C08L 83/04 156/329 |
| 2013/0276884 A1 * | 10/2013 | Ohwada .............. H01L 31/0481 136/259 |
| 2015/0218417 A1 * | 8/2015 | Miyamoto ............. C08L 83/00 524/588 |
| 2015/0352698 A1 * | 12/2015 | Hsu ....................... B25B 23/141 81/57.11 |
| 2016/0102225 A1 * | 4/2016 | Thiria ................ D06M 15/3562 280/743.1 |
| 2016/0333182 A1 * | 11/2016 | Jia ........................... C08L 83/04 |
| 2019/0225806 A1 * | 7/2019 | Muramatsu ............ C08G 77/20 |
| 2021/0277241 A1 * | 9/2021 | Mochizuki ............... C08K 3/01 |

FOREIGN PATENT DOCUMENTS

| CN | 105802238 A | 7/2016 |
| EP | 2845880 B1 | 4/2019 |
| JP | 2005-526398 A | 9/2005 |
| JP | 2007-63538 A | 3/2007 |
| JP | 2012-12433 A | 1/2012 |
| JP | 2015-52027 A | 3/2015 |
| KR | 10-2013-0112713 A | 10/2013 |
| WO | 03/098682 A1 | 11/2003 |
| WO | 2010/138221 A1 | 12/2010 |
| WO | 2012/002561 A1 | 1/2012 |
| WO | 2012069794 A1 | 5/2012 |

(Continued)

OTHER PUBLICATIONS

English language translation WO 2016/107533, Jul. 2016.*

(Continued)

*Primary Examiner* — Margaret G Moore
(74) *Attorney, Agent, or Firm* — Sheppard, Mullin, Richter & Hampton LLP

(57) ABSTRACT

Curable organopolysiloxane compositions and their cured products with superior properties are described as well as their uses as materials for optical devices, such as LEDs.

48 Claims, No Drawings

(56) References Cited

FOREIGN PATENT DOCUMENTS

| WO | 2015 096570   | * | 7/2015 |
| WO | 2015096570 A1 |   | 7/2015 |
| WO | 2016 105533   | * | 7/2016 |
| WO | 2016/107533 A1|   | 7/2016 |

OTHER PUBLICATIONS

International Search Report and Written Opinion dated Apr. 8, 2018 in corresponding International Patent Application No. PCT/CN2017/119650, filed Dec. 29, 2017, 6 pages.

* cited by examiner

CURABLE SILICONE COMPOSITIONS

CROSS-REFERENCE TO PRIOR APPLICATIONS

This application is a National Stage of PCT/CN2017/119650, filed Dec. 29, 2017, and designating the United States (published on Jul. 5, 2018, as WO, 2018/121706A1) which claims priority under 35 U.S.C. § 119 to International Patent Application No. PCT/CN2016/113942, filed Dec. 30, 2016, each hereby expressly incorporated by reference in its entirety and each assigned to the assignee hereof.

1. TECHNICAL FIELD

The present invention relates to a curable organopolysiloxane composition and their cured products, and the use of the compositions and their cured products in applications that desire good transparency, such as in optical devices, including LEDs.

2. BACKGROUND

Materials for coating and/or encapsulating optical devices, such as LEDs are known, but have not been optimized for key properties such as quick curing speed, high transparency, high hardness, and good adhesion. This need has not been fulfilled until now.

3. SUMMARY

Described herein are superior curable compositions and their cured products simultaneously possessing the desirable physical properties for broad applications, including for products, materials, or methods that desire good transparency, such as in optical related applications, among others. Some of the desirable physical properties achieved by the curable compositions and/or their cured products include high transparency, high hardness, and fast curing.

In certain embodiments, the superior curable compositions and their cured products also include the additional desirable physical property of good adhesion, that is they can adhere relatively strongly to a given substrate surface within a relatively short period of time.

In certain embodiments, the superior curable compositions comprise of (a) an effective amount of a first reactant comprising of one or more organopolysiloxanes, (b) an effective amount of a second reactant comprising of a SiH crosslinker, and (c) an effective amount of one or more polyaddition catalysts. The first reactant can comprise an effective amount of one or more essentially linear organopolysiloxane, an effective amount of one or more organopolysiloxane resins, preferably $MM^{Vi}Q$ (as described in Section 4.1), and an effective amount of one or more cyclic organopolysiloxane, preferably with a plurality of R'RSi units organized in a cyclic structure, where R' denotes an alkenyl group having 2 to 6 carbon atoms, preferably a vinyl group and R denotes an alkyl group having 1 to 6 linear or branched carbon atoms. The second reactant can comprise an effective amount of a plurality of SiH groups. The polyaddition catalyst can include a complex and/or compound with the metal platinum.

Advantageously, the curable compositions can tolerate other organopolysiloxane resins in combination with $MM^{Vi}Q$, such as $MD^{Vi}Q$, without compromising the desirable physical properties of the curable compositions or their cured products.

In certain embodiments, the superior curable compositions also comprise an effective amount of adhesion promoter to enhance the adhesion properties of the curable compositions and/or their cured products. The adhesion promoter can include an effective amount of adhesion compound and optionally an effective amount of polycondensation catalyst.

The superior curable compositions can be cured by various methods, including injection molding, transfer molding, casting, extrusion, overmolding, compression molding, and cavity molding.

Also described herein are exemplary composition formulations and uses of the curable compositions and their cured products. For example, the curable compositions and their cured products can be used in an optical device application, including LED encapsulation and sealing.

4. DETAILED DESCRIPTION

4.1 Interpretations and Definitions

Unless otherwise indicated, this description employs conventional methods and terms that have their ordinary meaning to persons of skill in the chemistry, organic chemistry, physical chemistry and polymer-chemistry field. All publications, references, patents and patent applications cited are hereby incorporated herein by reference in their entireties.

As used in this specification and the appended claims, the following general rules apply. Singular forms "a," "an" and "the" include plural references unless the content clearly indicates otherwise.

As used herein, the following terms shall have the specified meaning. The term "about" takes on its plain and ordinary meaning of "approximately" as a person of skill in the art would understand. The term "comprise," "comprising," "contain," "containing," "include," "including," "include but not limited to," or "characterized by" is inclusive or open-ended and does not exclude additional, unrecited elements.

As used herein, the following terms shall have the specified meaning:

"α1" means a linear organopolysiloxane, namely an alpha, omega-divinylpolydimethylsiloxane (CAS-No. 68083-19-2), which has two (2) alkenyl group having 2 to 6 carbon atoms and has a dynamic viscosity of around 3,500 mPa·s.

"α2" means a linear organopolysiloxane, namely an alpha, omega-divinylpolydimethylsiloxane (CAS-No. 68083-19-2), which has two (2) alkenyl group having 2 to 6 carbon atoms that has a dynamic viscosity of around 60,000 mPa·s.

"α3" means tetramethyltetravinylcyclotetrasiloxane (also known as $D_4^{Vi}$ a cyclic organopolysiloxane with the following structure:

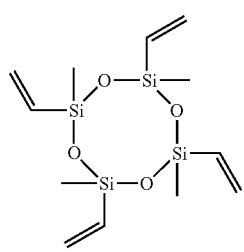

(Formula 4.1(i))

"β1" means a hydrogen-containing organopolysiloxane with the formula $Si(O(CH_3)_2SiH)_4$.

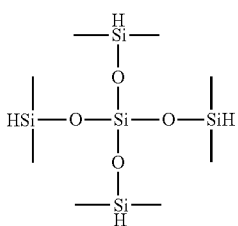

(Formula 4.1(ii))

"δ3" means tetrabutyl titanate with the structure:

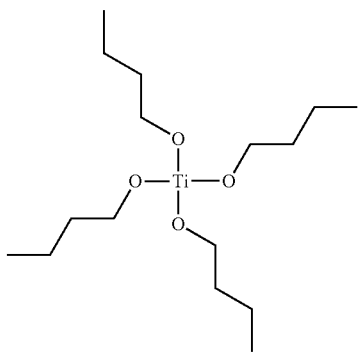

(Formula 4.1(iii))

"γ1" means a Karstedt platinum (pt) catalyst with a trade name "Karstedt concentrate" from W.C. Heraeus GmbH.

"δ1" means the reaction product of (A) a fluid organopolysiloxane containing at least one alkenyl having 2 to 6 carbon atoms group and at least one silanol group with (B) a hydrolysable silane containing at least one epoxide group having at least 4 to 10 carbon atoms. For example, 51 can be the product obtained by condensation of the following two materials

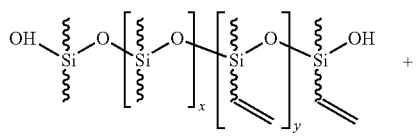

(A) (Formula 4.1 (iv))

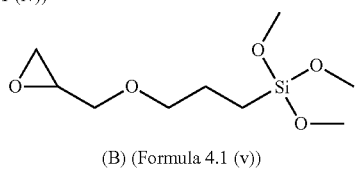

(B) (Formula 4.1 (v))

"δ2" means organopolysiloxane with one or more epoxide group having at least 4 to 10 carbon atoms. For example, 52 can be the product obtained by reacting an alpha, omega-dihydropolydimethylsiloxane (CAS-No. 70900-21-9) with an allyl glycidyl ether (CAS-No. CAS 106-92-3), wherein the reaction product comprises an epoxide group and has a dynamic viscosity of 150 mPa·s.

"organopolysiloxane" takes its ordinary meaning of a type of polysiloxanes or silicone, with mixed inorganic and organic polymers, or as a person of skill in the art would understand.

"SiH" means a siloxyl or silyl group or unit, wherein at least one hydrogen is covalently bonded to an silicon atom.

"viscosity", unless specified otherwise, means the dynamic viscosity measured in mPa·s in a manner that is known per se, at 25° C.

"$MDD^{Vi}Q$" means a organopolysiloxane resin of formula $MDD^{Vi}Q$, which comprises or consists essentially of the following units:
(a) one or more divalent siloxane unit $D^{Vi}$;
(b) one or more divalent siloxane unit D;
(c) one or more monovalent siloxane unit M; and
(d) one or more tetravalent siloxane unit Q.

"$MD^{Vi}Q$" means a organopolysiloxane resin of formula $MD^{Vi}Q$, which comprises or consists essentially of the following units:
(a) one or more divalent siloxane unit $D^{Vi}$;
(b) one or more monovalent siloxane unit M; and
(c) one or more tetravalent siloxane unit Q.

"$MD^{Vi}Q$" means a organopolysiloxane resin of formula $MD^{Vi}Q$, which comprises or consists essentially of the following units:
(a) one or more divalent siloxane unit $D^{Vi}$;
(b) one or more monovalent siloxane unit M; and
(c) one or more tetravalent siloxane unit Q.

"MD Q" means a organopolysiloxane resin of formula $MD^{Vi}Q$, which comprises or consists essentially of the following units:
(a) one or more divalent siloxane unit D;
(b) one or more monovalent siloxane unit M; and
(c) one or more tetravalent siloxane unit Q.

"$MM^{Vi}Q$" means a organopolysiloxane resin of formula $MM^{Vi}Q$, which comprises or consists essentially of the following units:
(a) one or more monovalent siloxane unit "$M^{Vi}$";
(b) one or more monovalent siloxane unit "M"; and
(c) one or more tetravalent siloxane unit "Q".

"$MT^{Vi}Q$" means a organopolysiloxane resin of formula $MT^{Vi}Q$, which comprises or consists essentially of the following units:
(a) one or more trivalent siloxane unit $T_{Vi}$;
(b) one or more monovalent siloxane unit M; and
(c) one or more tetravalent siloxane unit Q.

"$M^{Vi}Q$" means a organopolysiloxane resin of formula $M^{Vi}Q$, which comprises or consists essentially of the following units:
(a) one or more monovalent siloxane unit $M^{Vi}$; and
(b) one or more tetravalent siloxane unit Q.

"M'Q" means a organopolysiloxane resin of formula M'Q, which comprises or consists essentially of the following units:
(a) one or more monovalent siloxane unit $M^{Vi}$; and
(b) one or more tetravalent siloxane unit Q.

"$M^{Vi}T^{Vi}Q$" means a organopolysiloxane resin of formula $M^{Vi}D^{Vi}Q$, which comprises or consists essentially of the following units:
(a) one or more monovalent siloxane unit $M^{Vi}$;
(b) one or more trivalent siloxane unit $T_{Vi}$; and
(c) one or more tetravalent siloxane unit Q.

"D" means a Divalent siloxane unit with the formula $R_2SiO_{2/2}$, wherein R as used in this formula denotes a monovalent hydrocarbon group having 1 to 6 carbon atoms.

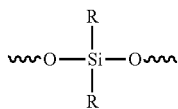
(Formula 4.1 (vi))

"$D^{Vi}$" means a Divalent siloxane unit with the formula $RR'SiO_{2/2}$, wherein R as used in this formula denotes a monovalent hydrocarbon group having 1 to 6 carbon atoms and R' as used in this formula denotes a vinyl group.

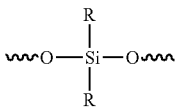
(Formula 4.1 (vii))

"D'" means a Divalent siloxane unit with the formula $HRSiO_{2/2}$, wherein R as used in this formula denotes a monovalent hydrocarbon group having 1 to 6 carbon atoms and H as used in this formula denotes hydrogen.

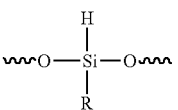
(Formula 4.1 (viii))

"M" means a Monovalent siloxane unit "with the formula $R_3SiO_{1/2}$, wherein R as used in this formula denotes a monovalent hydrocarbon group having 1 to 6 carbon atoms.

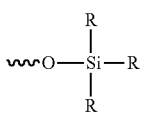
(Formula 4.1 (ix))

"$M_{Vi}$" means a Monovalent siloxane unit with the formula $R'R_2SiO_{1/2}$, wherein R as used in this formula denotes a monovalent hydrocarbon group having 1 to 6 carbon atoms and R' as used in this formula denotes a vinyl group.

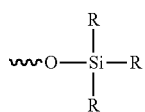
(Formula 4.1 (x))

"M'" means a Monovalent siloxane unit with the formula $HR_2SiO_{1/2}$, wherein R as used in this formula denotes a monovalent hydrocarbon group having 1 to 6 carbon atoms and H as used in this formula denotes hydrogen.

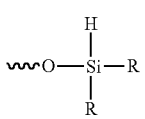
(Formula 4.1 (xi))

"Q" means a tetravalent siloxane unit with the formula $SiO_{4/2}$.

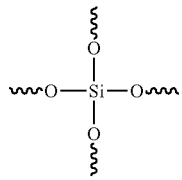
(Formula 4.1 (xii))

"$T^{Vi}$" means a Trivalent siloxane unit with the formula $R'SiO_{3/2}$, wherein R' as used in this formula denotes a vinyl group.

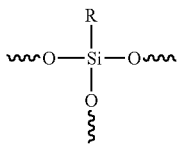
(Formula 4.1 (xiii))

4.2 Organopolysiloxane Materials

Organopolysiloxane is a type of polysiloxanes or silicones. Organopolysiloxanes can have many advantages, which can include good heat resistance, low temperature resistance, and electrical insulation properties. Therefore, curable organopolysiloxane compositions obtained by a hydrosilylation reaction can have a wide range of industrial and consumer applications. For example, curable polysiloxanes compositions can be used to form a protective coating and/or as an encapsulating material for optical devices such as light-emitting diodes ("LEDs") and other optical devices. Curable polysiloxanes compositions can also be used in transparent silicone encapsulation applications.

4.3 Optical Material for LED Applications

Light-Emitting Diodes ("LEDs") are semiconductor diodes that emit light with conducting current. LEDs have significant advantages over traditional optical devices, such as incandescent bulbs and compact fluorescent bulbs. These advantages include lower energy consumption, smaller size, longer service life, and more environmental friendly properties. As a result, LEDs are widely used as light sources, including in home and commercial lighting; in the field of special lighting, including in automobiles, on the street, and in traffic lights; and in displays, including in industrial equipment, instrumental panels, computer, TV and mobile screens, and advertising panels. However, it has been challenging to develop materials optimized for LED use. One reason for this challenge is that the materials that make up the LEDs must simultaneously exhibit high transparency, high hardness, and good adhesion.

Early protective and/or encapsulating materials for LEDs have mostly been comprised of or derived from epoxy resin. While epoxy resins can exhibit the advantages such as strong adhesion and high refractive index, they can also become easily weathered and discolored over time. In contrast, silicones have many advantages such as resistance to weathering, resistance to heat and resistance to discoloration that make them a superior material for protecting and/or encapsulating LEDs. However, it has been difficult to obtain silicones that can achieve the optimum characteristics for these applications, including the characteristics of high transparency, good adhesion, quick curing speed, high hardness, and particularly a combination of these characteristics.

Previously, the industry, in general, has been able to achieve a hardness of from about 60 to about 70 shore A. However, it has been challenging to optimize the hardness of the composition for optical applications, such as LEDs. This is undesirable because a composition with a low hardness makes the silicone more vulnerable to scratching and wear-and-tear. However, increasing the hardness of a composition generally results in a compromise the adhesive strength of the silicone, making it more vulnerable to peeling and less suitable for LED applications.

Moreover, traditionally, one way of increasing the hardness of a silicone is to add inorganic fillers to the silicone. However, introduction of inorganic fillers to the silicones reduces the transparency properties of the silicones, thereby compromising another desirable characteristics crucial for LED applications. Another option to increase the hardness of a silicone is to introduce organic groups, such introducing rigid units with aromatic groups to the silicone. While this approach can increase the hardness of the silicone, the aromatic groups can cause yellowing of the silicone with age, thereby rendering them unacceptable for optical and/or LED coating or encapsulating applications.

Prior compositions also includes compositions comprised of both high and low viscosity polydiorganosiloxane having at least two (2) aliphatically unsaturated organic groups, a silicone resin with at least two (2) aliphatically unsaturated organic groups, a crosslinker having at least two (2) silicon bonded hydrogen atoms and a hydrosilylation catalyst. WO 2010/138221 A1 (2010). However, the authors did not disclose an optical polydiorganosiloxane composition with the desirable properties of quick curing speed and good adhesion.

Other curable organopolysiloxane compositions can have good light transmission properties for LED application. U.S. Pat. No. 8,389,650 B2. These compositions includes (1) a branched organopolysiloxane comprising an $SiO_{4/2}$ unit and an $R_3SiO_{1/2}$ unit, and optionally an $R_2SiO$ unit and/or an $RSiO_{3/2}$ unit, wherein at least three (3) R per molecule are alkenyl groups having 2 to 6 carbon atoms, (2) an optional linear organopolysiloxane having alkenyl groups having 2 to 6 carbon atoms, (3) a polysiloxane with SiH group comprising an $SiO_{4/2}$ unit and an $H(CH_3)_2SiO_{1/2}$ unit, and (4) a platinum group metal compound. However, the authors also did not disclose an optical polydiorganosiloxane composition with the desirable properties of quick curing speed and good adhesion.

We have previously described a transparent silicone composition comprising a $MM^{Vi}Q$ resin, a crosslinker having silicone bonded hydrogen, and hydrosilylation catalyst. WO 2016/107533 A1 and CN 105802238 A. However, until now, to our knowledge, no known compositions could simultaneously achieve a combination or balance of one or more of good adhesion, high hardness and high transparency, as achieved by the compositions and their products described herein.

Finally, other compositions have addressed adhesion issues of organopolysiloxane with specialized adhesion promoter(s). US 2010/0255205 A1. However, these compositions do not disclose or address the use of adhesion promoter for use in LEDs and do not disclose or address the adhesion promoter's effect on the other desirable properties, including the transparency of the product.

In contrast to prior disclosures, the inventors here describe curable organopolysiloxane compositions for optical related applications, such as LEDs, where the compositions and their products simultaneously exhibits the desirable characteristics of good transparency, high hardness, and fast curing speed.

For example, the compositions described herein have excellent transparency properties. For example, the composition can generally have a transparency of above about 82% at about 450 nm wavelength. In some embodiments, the transparency of the composition can be above about 90% at about 450 nm wavelength; in some other embodiments, the transparency can be above about 92% at about 450 nm wavelength.

In terms of hardness, whereas prior compositions in the industry typically have a hardness of between about 60 to about 70 shore A, the compositions described herein have a hardness of above about 75 shore A. In some embodiments, the hardness can be from about 75 to about 80 shore A; and in some other embodiments, the hardness can be from about 80 to about 90 shore A.

In terms of curing speed, whereas prior compositions in the industry typically require curing to take place for 2 to 5 hours at from 150° C. to 170° C., curing for the compositions described herein can be completed in about 1 minute to about 120 minutes at from about 80° C. to about 200° C. In some embodiments, adequate curing can be achieved at about in about 1 minute to about 60 minutes at from about 100° C. to about 180° C.; in some other embodiments, adequate curing can be achieved at about in about 2 minute to about 50 minutes at from about 110° C. to about 170° C.; in some other embodiments, adequate curing can be achieved at about in about 3 minute to about 40 minutes at from about 120° C. to about 170° C.; in some other embodiments, adequate curing can be achieved in about 5 minute to about 20 minutes at from about 150° C. to about 170° C.; in some other embodiments, adequate curing can be achieved at about 160° C. for only about 10 minutes. The remarkably high curing speed of these compositions is a significant advancement over existing compositions and is highly desirable in the fast-paced manufacturing industry.

In addition to these advantages, the curable organopolysiloxane composition can be further optimized to quickly adhere well to substrate surfaces, such as glass and aluminum, for example, during the curing process. To illustrate, in certain embodiments, the compositions can adequately adhere to glass or aluminum after curing at 160° C. for about 10 minutes.

Moreover, because in certain embodiments, the compositions can tolerate additional compounds while maintaining their desirable physical properties, the compositions can be further optimized to achieve additional properties tailored for a particular application. Thus, the compositions and their products have the further advantages of being applicable to and suited for a wide range of applications and industry needs, even as the industry needs evolve overtime.

4.4 Curable Compositions and Cured Products for Optical Applications Optimized for High Transparency, High Hardness and Fast Curing Speed The inventors have described superior curable organopolysiloxane compositions and/or their cured products with high hardness (above about 75 shore A), fast curing speed, good transparency, all of which are highly desirable characteristics for optical related applications, among others. Examples of the optical related applications include applications for LEDs, charged coupled devices, light guides, optical cameras, photo-couplers, and waveguides.

Advantageously, the compositions and products described herein do not require the addition of filler and/or other organic groups to achieve these desirable characteristics. In fact, the compositions and their products described herein can be completely or substantially (i.e. less than about 1%) free of any such fillers. Accordingly, the superior compositions and their products, unlike other compositions and their products, possess good transparency. The inventors further show that the cured product of the composition described herein exhibits advantageous characteristics including high hardness, good adhesion and fast curing speed. Together, the superior compositions and their products described herein have broad applications, including, for products, materials, or methods that desire good transparency, such as LED encapsulation and related optical application.

4.4.1 A—Organopolysiloxane

In general, the compositions described herein comprise an optimum, or at least sufficiently effective amount of a first reactant, an organopolysiloxane ("A") in the polyaddition curing reaction. The first reactant organopolysiloxane (A) may comprise compounds with a linear, branched, cyclic or network structure. Examples of the first reactant (A) include dimethylpolysiloxanes containing dimethylvinylsilyl end groups, (methylvinyl)(dimethyl)polysiloxane copolymers containing trimethylsilyl end groups, (methylvinyl)(dimethyl)polysiloxane copolymers containing dimethylvinylsilyl end groups, and cyclic methylvinylpolysiloxanes.

More specifically, the first reactant organopolysiloxane (A) comprises an optimum, or at least sufficiently effective, amount of one or more essentially linear organopolysiloxane ("A1"), an optimum, or at least sufficiently effective, amount of one or more organopolysiloxane resin ("A2"), and an optimum, or at least sufficiently effective, amount of one or more cyclic organopolysiloxane ("A3"). The first reactant can comprise the following formula:

(i) siloxyl units of formula: $R^1_a Z_b SiO_{(4-(a+b))/2}$ ("Formula 4.4.1(i)"); and (ii) optional with other siloxyl units of formula: $Z_c SiO_{(4-c)/2}$ ("Formula 4.4.1(ii)"), wherein:

"$R^1$" as used in these formula represents an alkenyl group having 2 to 6 carbon atoms, preferably a vinyl or allyl group;

"Z" as used in these formula, which can be identical or different, each represents a monovalent hydrocarbon-based group, free of unfavorable action on the activity of the catalyst and chosen from (a) alkyl groups having between one (1) to eight (8) atoms, inclusive, optionally substituted with at least one halogen atom, and (b) aryl groups;

"a" as used in these formula represents an integer 1 or 2, wherein the sum of "a+b" is 1, 2, or 3;

"b" as used in these formula represents an integer 0, 1, or 2, wherein the sum of "a+b" is 1, 2, or 3;

"c" as used in these formula represents an integer 0, 1, 2, or 3;

"Si" as used in these formula represents silicon; and

"O" as used in these formula represents oxygen.

In general, "Z" can be chosen from methyl, ethyl and phenyl radicals, wherein at least 60 mol % (or in numerical terms) of the radicals Z are methyl radicals.

Examples of siloxyl units of Formula 4.4.1(i) include vinyldimethylsiloxyl, vinylphenylmethylsiloxyl, vinylmethylsiloxyl, and vinylsiloxyl units.

Examples of the optional additional siloxyl units of Formula 4.4.1 (ii) include $SiO_{4/2}$, dimethylsiloxyl, methylphenylsiloxyl, diphenylsiloxyl, methylsiloxyl, and phenylsiloxyl.

4.4.2 A1—Essentially Linear Organopolysiloxane

The essentially linear organopolysiloxane (A1) should contain at least one essentially linear organopolysiloxane with at least two alkenyl group having 2 to 6 carbon atoms, wherein each of the alkenyl is bonded to a silicon atom. The essentially linear organopolysiloxane may contain linear, branched, cyclic, or network structure, or a combination thereof, preferably an essentially linear structure. The essentially linear organopolysiloxane should have a dynamic viscosity of between about 10 mPa·s and about 200 000 mPa·s. In a preferred embodiment, the alkenyl group in the essentially linear organopolysiloxane (A1) is a vinyl group. In one embodiment, the essentially linear organopolysiloxane (A1) can have a structural group having up to 6 carbon atoms, as exemplified by having a hexenyl, vinyl, allyl or pentenyl group, preferably a vinyl group. The alkenyl can alternatively be a cycloalkenyl such as a cyclohexenyl group.

In an exemplary embodiment, the essentially linear organopolysiloxane (A1) can comprise of only one kind of essentially linear organopolysiloxane. In another exemplary embodiment, the essentially linear organopolysiloxane (A1) can comprise of a mixture of different kinds of essentially linear organopolysiloxanes. For example, an exemplary embodiment of the essentially linear organopolysiloxane (A1) can include α1 and α2, both of which are defined in Section 4.1.

4.4.3 A2—Organopolysiloxane Resin

The organopolysiloxane resin (A2) should contain at least one organopolysiloxane resin with at least one vinyl group. The preferred organopolysiloxane resin (A2) is $MM^{Vi}Q$, as defined in Section 4.1.

Advantageously, the compositions can tolerate the presence of other organopolysiloxane resin(s), while maintaining desirable characteristics. For example, the organopolysiloxane (A) can comprise, in addition to $MM^{Vi}Q$, additional types of organopolysiloxane resin (A2). Additional types of organopolysiloxane resins (A2) tolerated include compounds that comprise at least two different siloxane units chosen from those of M siloxane unit of formula $R_3SiO_{1/2}$, D siloxane unit of formula $R_2SiO_{2/2}$, T siloxane unit of formula $RSiO_{3/2}$, and Q siloxane unit of formula $SiO_{4/2}$, wherein R as used in these formula denotes a monovalent hydrocarbon group having 1 to 6 carbon atoms, with the conditions that (i) at least one of these siloxane units being a T or Q siloxane unit and (ii) at least one of the M, D and T siloxane units comprises an alkenyl group having 2 to 6 carbon atoms. Examples of such additional organopolysiloxane resin(s) (A2) tolerated include $DD^{Vi}Q$, $MD^{Vi}Q$, $MT^{Vi}Q$, $M^{Vi}Q$, and $M^{Vi}T^{Vi}Q$ among others.

It is important to note that the amount of $MM^{Vi}Q$ should be optimal or at least sufficiently effective at all times, particularly when additional organopolysiloxane resins are blended with $MM^{Vi}Q$. This is because reducing the amount of $MM^{Vi}Q$ in A1 can affect the optimum curing speed. Accordingly, an exemplary amount of additional organopolysiloxane resin(s) (i.e. organopolysiloxane resin(s) that is not $MM^{Vi}Q$) should not exceed about 40% of total organopolysiloxane resin(s) (A2) by weight.

4.4.4 Organopolysiloxane (A)—Exemplary Formulations

An exemplary embodiment of the organopolysiloxane (A) is formulation α1:α2:$MM^{Vi}Q$=40:20:40 ("Formulation I"), wherein the essentially linear organopolysiloxane (A1) comprises about 40% by weight of organopolysiloxane α1 and about 20% by weight α2; and the organopolysiloxane resin (A2) comprises about 40% by weight of $MM^{Vi}Q$. See for example, Table 1 at columns F0, F1, F3, F6-F8, and F14-F16. Advantageously, the formulation can achieve, among others, high hardness, high transparency, and quick curing speed.

Another exemplary embodiment of the organopolysiloxane (A) is formulation α1:α2:$MM^{Vi}Q$:$MD^{Vi}Q$=35.2: 24.8:35.2:4.8 ("Formulation II"), wherein the essentially linear organopolysiloxane (A1) comprises about 35.2% by weight of organopolysiloxane α1 and about 24.8% by weight α2; and the organopolysiloxane resin (A2) comprises about 35.2% by weight of $MM^{Vi}Q$ and about 4.8% by weight of $MD^{Vi}Q$. See for example, Table 1 at column F9. Another exemplary embodiment of the organopolysiloxane (A) is formulation α1:α2:$MM^{Vi}Q$:$MD^{Vi}Q$=27.95:32.05:27.94: 12.06 ("Formulation III"), wherein the essentially linear organopolysiloxane (A1) comprises about 27.95% by weight of organopolysiloxane α1 and about 32.05% by weight α2; and the organopolysiloxane resin (A2) comprises about 27.94% by weight of $MM^{Vi}Q$ and about 12.06% by weight of $MD^{Vi}Q$. See for example, Table 1 at column F10. Advantageously, both formulations can achieve, among others, high hardness, high transparency, and fast curing speed.

4.4.5 A3—Cyclic Organopolysiloxane

The addition of an optimum, or at least sufficiently effective amount, of a cyclic organopolysiloxane (A3) can serve as a hardness enhancer because it can improve the hardness of the final product.

Here, the cyclic organopolysiloxane (A3) comprises a plurality of R'RSiO units organized in a cyclic structure, wherein the R', as used in this formula, is an alkenyl group having 2 to 6 carbon atoms, preferably a vinyl group, and the R, as used in this formula, is an alkyl group having 1 to 6 linear or branched carbon atoms. The R'RSiO units can be repetitive units forming the cyclic structure. In an exemplary embodiment of the cyclic organopolysiloxane (A3), in which each silicon atom in the R'RSiO unit is connected to a vinyl group. One exemplary embodiment of the cyclic organopolysiloxane (A3) is a methylvinylpolysiloxane.

In general, cyclic organopolysiloxane (A3) is thought to be a good curing retardant. Here, however, the inventors have found that the cyclic organopolysiloxane (A3) with its plurality of branched R' groups can greatly increase the crosslinking degree during the reaction and greatly enhance the hardness of the final product.

The inventors have found that the preferred embodiment of the cyclic organopolysiloxane (A3) comprises at least about 3 R'RSiO units with at least about 3 vinyl groups, further preferably between about 3 to about 8 R'RSiO units with between about 3 to about 8 vinyl groups, and further preferably about 4 SiO units and about 4 vinyl groups. An exemplary embodiment of the cyclic organopolysiloxane (A3) is α3, a tetramethyltetravinylcyclotetrasiloxane.

It is important to note that in an exemplary embodiment, the amount of the cyclic organopolysiloxane (A3) should be optimal, or at least sufficiently effective, at all times. Too much of the cyclic organopolysiloxane (A3), such as α3, can lead to over-whiteness and/or increased turbidity of the cured product thereby reducing the transparency in the cured product. Accordingly, in an exemplary embodiment with high transparency, the amount of A3 is optimized, or at least made sufficiently effective. For example, high transparency, preferably above 88% transmission at about 450 nm, can be achieved by optimizing the mass ratio of the cyclic organopolysiloxane A3 to the sum of the essentially linear organopolysiloxane A1 and organopolysiloxane resin A2 from about $0.5 \times 10^{-2}$ to about $8 \times 10^{-2}$; preferably from about $1.5 \times 10^{-2}$ to about $7 \times 10^{-2}$; and further preferably from about $2 \times 10^{-2}$ to about $6 \times 10^{-2}$.

4.4.6 B—SiH Crosslinker

The compositions also can comprise an optimum, or at least sufficiently effective, amount of a second reactant, a SiH crosslinker ("B"), in the polyaddition curing reaction. The SiH crosslinker (B) can be a linear, branched, cyclic, or network organopolysiloxane, which comprises at least two SiH group. The SiH crosslinker (B), which is a organopolysiloxane, can have for example, two (2) SiH groups, three (3) SiH groups, four (4) SiH groups, or more. The SiH group(s) can be situated within the organopolysiloxane chain and/or at the end of the organopolysiloxane chain. The SiH crosslinker (B) can have a dynamic viscosity of at least 5 mPa·s, preferably from about 5 mPa·s to about 1000 mPa·s.

In an exemplary embodiment, a first reactant organopolysiloxane (A) that contains two (2) alkenyl groups per molecule should include a B that comprises three (3) or more SiH groups. In another exemplary embodiment, a first reactant organopolysiloxane (A) that contains three (3) or more alkenyl groups per molecule should include a B that comprises at least two (2) SiH groups.

In one embodiment, the SiH crosslinker (B) can comprise the following formula:
(i) siloxyl units formula: $H_d L_e SiO_{(4-(d+e))/2}$ ("Formula 4.4.6 (i)"); and
(ii) optional with other siloxyl units, such that the average formula of these other siloxyl units is: $L_g SiO_{(4-g)/2}$ ("Formula 4.4.6(ii)"), wherein:

"L" as used in these formula represents a monovalent hydrocarbon group having 1 to 6 carbon atoms, wherein the hydrocarbon group having no (or substantially no) unfavorable effect on the activity of the polyaddition catalyst (C, defined in Section 4.4.7) and is preferably selected from alkyl groups having between one (1) to eight (8) atoms, inclusive, optionally substituted with at least one halogen atom; further preferably selected from methyl, ethyl, propyl, and 3,3,3-trifluoropropyl groups, from aryl groups, and from xylyl, tolyl, and phenyl radicals;

"H" as used in these formula represents hydrogen;

"Si" as used in these formula represents silicon;

"O" as used in these formula represents oxygen;

"d" as used in these formula represents an integer 1 or 2, wherein the sum of "d+e" is 1, 2, or 3;

"e" as used in these formula represents an integer 0, 1, or 2, wherein the sum of "d+e" is 1, 2, or 3; and "g" as used in these formula represents an integer 0, 1, 2, or 3.

Examples of the siloxyl units of Formula 4.4.6(i) include $H(CH_3)_2SiO_{1/2}$, $HCH_3SiO_{2/2}$, and $H(C_6H_5)SiO_{2/2}$. Examples of the optional additional siloxyl units of Formula 4.4.6(ii) include $SiO_{4/2}$ siloxyl, dimethylsiloxyl, trimethylsiloxyl, methylphenylsiloxyl, diphenylsiloxyl, methylsiloxyl, and phenylsiloxyl units. Examples of linear and cyclic SiH crosslinker (B) include dimethylpolysiloxanes containing hydrogendimethylsilyl end groups, copolymers containing (dimethyl)(hydrogenomethyl)polysiloxane units containing trimethylsilyl end groups, copolymers containing (dimethyl)(hydrogenomethyl)polysiloxane units containing hydrogenodimethylsilyl end groups, hydrogenomethylpolysiloxanes containing trimethylsilyl end groups, and cyclic hydrogenomethylpolysiloxanes. The SiH crosslinker (B) can optionally be a mixture of a dimethylpolysiloxane containing hydrogenodimethylsilyl end group and of a organopolysiloxane comprising at least three (3) hydrogenosiloxyl groups.

In an exemplary embodiment, the molar ratio of the number of hydrogen atoms linked to the silicon atom in the SiH crosslinker (B) and the total number of groups with alkenyl unsaturation in first reactant organopolysiloxane (A) is from about 0.4 to about 10, preferably from about 0.6 to about 5, further preferably from about 1 to about 5, further preferably from about 1.5 to about 4, further preferably from about 1.5 to about 3, further preferably from about 1.5 to about 2.7.

In one exemplary embodiment, the SiH crosslinker (B) is the organopolysiloxane resin M'Q (see Section 4.1). In another exemplary embodiment, the SiH crosslinker (B) is the organopolysiloxane resin MD'Q (see Section 4.1). In another exemplary embodiment, the SiH crosslinker (B) is β1 (see Section 4.1).

4.4.7 C—Polyaddition Catalyst

The compositions can also comprise an optimum, or at least sufficiently effective, amount of a polyaddition catalyst ("C") in the polyaddition curing reaction. The addition of C can improve the speed of the crosslinking and/or hydrosilylation reaction. Suitable polyaddition catalysts (C) include complexes or compounds of group VIII metals, such as platinum, ruthenium, rhodium, palladium, osmium and indium. In some embodiments, the polyaddition catalyst (C) includes platinum compounds or complexes such as chloroplatinic acid and platinum acetylacetonate; complexes of platinous halides with unsaturated compounds, such as ethylene, propylene, organovinylsiloxanes and styrene; hexamethyldiplatinum; $PtCl_2.PtCl_3$; and $Pt(CN)_3$. In some embodiments, the polyaddition catalyst (C) includes a rhodium complex, such as $RhCl_3(Bu_2S)_3$.

In some other embodiments, the polyaddition catalyst (C) can be a complexes or compounds comprising the metal platinum well known to a person of ordinary skill in the art. Examples of such complexes or compounds include the complexes described, for example, in U.S. Pat. Nos. 3,159,601, 3,159,602, 3,220,9723, EP-A-0,057,579, EP-A-0,188,978, and EP-A-0,190,530; and the platinum and vinyl organosiloxane complexes described in U.S. Pat. Nos. 3,419,593, 3,715,334, 3,377,432, and 3,814,730. In general, the amount of the platinum containing polyaddition catalyst (C) is from about 2 ppm to about 400 ppm by weight of the platinum metal based on the total weight of the first reactant organopolysiloxane (A) and the SiH crosslinker (B); preferably from about 2 ppm to about 100 ppm; further preferably from about 2 ppm to about 30 ppm; further preferably from about 2 ppm to about 10 ppm; and further preferably from about 3 ppm to about 9 ppm. One exemplary polyaddition catalyst (C) is γ1.

4.4.8 Exemplary Formulations

The inventors have discovered curable compositions and/or their cured products that can achieve high hardness, preferably above about 75 shore A, high transparency, preferably above about 85% at about 450 nm wavelength and fast curing speed. Importantly the curable composition can be made without any additives or fillers. In one exemplary embodiment, the composition comprises of a formulation of α1:α2:MM$^{Vi}$Q:α3:β1:γ1=40:20:40:3.78:16.13:0.004 (by weight) ("Formulation IV"). See for example, Table 1 at column F0. Advantageously, even without any additional additives or fillers, the composition can achieve high hardness, good curing speed, and high transparency, among others.

The inventors have discovered a curable composition that can tolerate the presence of additional components while achieving high hardness, high transparency, and fast curing speed. In one exemplary embodiment, the composition comprises of a formulation of α1:α2:MM$^{Vi}$Q:α3:β1:γ1:δ1:δ3=40:20:40:3.78:16.13:0.004:0.54:0.05 (by weight) ("Formulation V"). See for example, Table 1 at column F1. In another exemplary embodiment, the composition comprises of a formulation of α1:α2:MM$^{Vi}$Q:MD$^{Vi}$Q:α3:β1:γ1:δ1:δ3=35.2:24.8:35.2:4.8:3.77:15.77:0.004:0.54:0.05 (by weight) ("Formulation VI"). See for example, Table 1 at column F9. Advantageously, the composition can tolerate the presence of these additional components without compromising its desirable qualities of high hardness, high transparency, and fast curing speed, among others.

4.5 A Curable Composition for Optical Applications Optimized for High Transparency, High Hardness, Fast Curing Speed, and Improved Adhesion 4.5.1 D—Adhesion Promoters The compositions can also further comprise an optimum, or at least sufficiently effective, amount of adhesion promoters ("D") to improve the adhesion properties. With the addition of an optimum, or at least sufficiently effective, amount of D, the resulting cured products can quickly adhere to a given substrate surface forming good adherences. Accordingly, these compositions and their products possess yet another highly desirable property for optical applications, namely good and improved adhesion.

In certain embodiments, the addition of an optimum, or at least sufficiently effective, amount of adhesion promoters (D) can achieve good and fast adhesion, including at a speed that can meet the current industry demand, without compromising the desirable properties of high transparency, high hardness, and fast curing speed. Moreover, the good and fast adhesion can also be achieved on a wide range of materials including glass and/or aluminum, using an optimized, or at least sufficiently effective, adhesion promoter (D).

In a preferred embodiment, the adhesion promoter (D) comprises an optimum, or at least sufficiently effective, amount of adhesion compound ("D1") in the presence or absence of an optimum, or at least sufficiently effective, amount of a polycondensation catalyst ("D2"). It is possible to use any adhesion compound (also known as adhesion promoter) (D1) commonly used in the field. For example, use could be made of:

a vinyl-based silane or organosiloxane alone or partially hydrolyzed and also one of its reaction products;

a silane or organosiloxane functionalized by an epoxy functional group alone or partially hydrolyzed and also one of its reaction products;

an amino-functional silane or organosiloxane alone or partially hydrolyzed and also one of its reaction products and/or a silane or organosiloxane functionalized by an anhydride radical alone or partially hydrolyzed and also one of its reaction products. An exemplary embodiment of the adhesion compound (D1) is δ1. Another exemplary embodiment of the adhesion compound (D1) is the combination of δ1 and δ2. An exemplary embodiment of the polycondensation catalyst (D2) is an organometallic catalyst. One example of such organometallic catalyst is δ3.

In a preferred embodiment the mass ratio of the adhesion promoter D1 to the sum of the essentially linear organopolysiloxane A1 and organopolysiloxane resin A2 is from about $0.01\times10^{-2}$ to about $10\times10^{-2}$; preferably from about $0.1\times10^{-2}$ to about $5\times10^{-2}$, further preferably from about $0.3\times10^{-2}$ to $4\times10^{-2}$.

In a preferred embodiment, the amount of D2 to the sum of the essentially linear organopolysiloxane A1 and organopolysiloxane resin A2 is from about $0.001\times10^{-2}$ to about $2\times10^{-2}$; preferably between about $0.01\times10^{-2}$ to about $1\times10^{-2}$; further preferably between about $0.03\times10^{-2}$ to about $0.5\times10^{-2}$ In certain embodiments, additional ingredients such as one or more inhibitor, curing retardant, filler, heat stabilizer, flame retardant, or a combination thereof may be added without reducing the desired transparency, hardness, adhesion and quick curing speed properties.

4.5.2 Exemplary Formulations

The inventors have discovered curable compositions and/or their cured products that can achieve high hardness, preferably above about 75 shore A, high transparency, preferably above about 85% at about 450 nm wavelength, fast curing speed, and good and fast adhesion to a various different surfaces. In one exemplary embodiment, the composition comprises of a formulation of $\alpha1:\alpha2:MM^{Vi}Q:\alpha3:\beta1:\gamma1:\delta1:\delta3=40:20:40:5.36:19.57:0.004:0.56:0.06$ (by weight) ("Formulation VII"). See for example, Table 1 at column F3. In another exemplary embodiment, the composition comprises of a formulation of $\alpha1:\alpha2:MM^{Vi}Q:\alpha3:\beta1:\gamma1:\delta1:\delta2=40:20:40:3.93:16.45:0.004:0.56:4.37$ (by weight) ("Formulation VIII"). See for example, Table 1 at column F16. Advantageously, both compositions and/or their cured products can achieve high hardness, high transparency, good adhesion, and good and fast adhesion. Moreover, Formulation VII can achieve these desirable properties in the presence of a polycondensation catalyst (D2), while Formulation VIII can achieve these desirable properties even in the absence of a polycondensation catalyst (D2). This shows, among others, the versatility of the compositions and their cured product. 4.5.3 Additional Exemplary Formulations The inventors have discovered curable organopolysiloxane compositions X comprising:

(a1) one or more essentially linear organopolysiloxane A1 containing at least two alkenyl groups having 2 to 6 carbon atoms bonded to a silicon atom; and (b1) one or more organopolysiloxane resin A2 comprising at least one resin of formula $MM^{Vi}Q$, consisting essentially of the following units:
  (i) one or more monovalent siloxane unit $M^{Vi}$ with the formula 4.1(x) $R'R_2SiO_{1/2}$ and the chemical structure;
  (ii) one or more monovalent siloxane unit M with the formula 4.1(ix) $R_3SiO_{1/2}$ and the chemical structure; and
  (iii) one or more tetravalent siloxane unit Q with the formula 4.1(xii) $SiO_{4/2}$ and the chemical structure:
wherein, as used in these formulas, R denotes a monovalent hydrocarbon group having 1 to 6 carbon atoms and R' denotes a vinyl group, (a3) one or more cyclic organopolysiloxane A3 consisting of R'RSiO units organized in a cyclic structure, wherein the R' as used in this formula denotes an alkenyl group having 2 to 6 carbon atoms, preferably a vinyl group, and the R as used in this formula denotes a alkyl group having 1 to 6 linear or branched carbon atoms;

(b) one or more organopolysiloxane crosslinker B comprising at least two and preferably at least three SiH groups, wherein SiH means a siloxyl or silyl group or unit, wherein at least one hydrogen is covalently bonded to an silicon atom; and (c) an effective amount of one or more polyaddition catalysts C, preferably a complex and/or compound with platinum.

In a preferred embodiment of composition X, the cyclic organopolysiloxane A3 is a methylvinylpolysiloxane, preferably tetramethyltetravinylcyclotetrasiloxane.

In a preferred embodiment of composition X, the wherein the organopolysiloxane crosslinker B is a branched or network organopolysiloxane, preferably a M'Q resin with the formula 4.1(ii) $Si(O(CH_3)_2SiH)_4$.

In a preferred embodiment of composition X, one or more organopolysiloxane resin A2 of formula $MM^{Vi}Q$.

In a preferred embodiment of composition X, the amount of $MM^{Vi}Q$ resin is at least 60% by weight of total amount of organopolysiloxane resins A2.

An exemplary formulation of composition X comprises one or more combination of features of the preferred embodiments described in this section, wherein the essentially linear organopolysiloxane A1 that has a dynamic viscosity of between about 10 mPa·s and about 200 000 mPa·s, preferably between 200 mPa·s and about 100000 mPa·s; further preferably between 3000 mPa·s and about 70000 mPa·s. A preferred embodiment further comprises at least one ratio of components selected from the group consisting of:

the mass ratio of the organopolysiloxane resin A2 to the essentially linear organopolysiloxane A1 is from about 0.4 to about 1; preferably from about 0.6 to about 0.8; further preferably from about 0.6 to about 0.7;

the mass ratio of the cyclic organopolysiloxane A3 to the sum of the essentially linear organopolysiloxane A1 and organopolysiloxane resin A2 is from about $0.5\times10^{-2}$ to about $8\times10^{-2}$; preferably from about $1.5\times10^{-2}$ to about $7\times10^{-2}$; and further preferably from about $2\times10^{-2}$ to about $6\times10^{-2}$;

the molar ratio of the number of hydrogen atoms linked to a silicon atom to the total number of alkenyl unsaturation in the composition is from about 0.4 to about 10, preferably from about 0.6 to about 5, further preferably from about 1 to about 5, further preferably from about 1.5 to about 4, further preferably from about 1.5 to about 3, preferably from about 1.5 to about 2.7;

the mass ratio of the polyaddition catalyst C to the composition X is from about $0.2\times10^{-6}$ to about $10000\times10^{-6}$; preferably from about $0.5\times10^{-6}$ to about $300\times10^{-6}$; further preferably from about $1\times10^{-6}$ to about $100\times10^{-6}$;

the mass ratio of the adhesion promoter D1 to the sum of the essentially linear organopolysiloxane A1 and organopolysiloxane resin A2 is from about $0.01\times10^{-2}$ to about $10\times10^{-2}$; preferably from about $0.1\times10^{-2}$ to about $5\times10^{-2}$, further preferably from about $0.3\times10^{-2}$ to $4\times10^{-2}$;

the mass ratio of the polycondensation catalyst D2 to the sum of the essentially linear organopolysiloxane A1 and organopolysiloxane resin A2 is from about $0.001\times10^{-2}$ to about $2\times10^{-2}$; preferably between about $0.01\times10^{-2}$ to about $1\times10^{-2}$; further preferably between about $0.03\times10^{-2}$ to about $0.5\times10^{-2}$; and combinations thereof.

4.6 Curing of the Compositions to Produce the Cured Products

In general, the compositions can be cured to produce the cured products using any methodologies known to a person of ordinary skilled in the art. For example, curing can be done by injection molding, transfer molding, casting, extrusion, overmolding, compression molding, and cavity molding. Curing conditions can also be optimized, or at least made sufficiently effective, to produce the cured product. For example the compositions can be cured to produce the cured product by curing from about 80° C. to about 200° C. for about 1 minute to about 120 minutes; from about 100° C. to about 180° C. for about in about 1 minute to about 60 minutes; from about 110° C. to about 170° C. for about 2 minute to about 50 minutes; from about 120° C. to about 170° C. for about 3 minute to about 40 minutes; from about 150° C. to about 170° C. for about 5 minute to about 20 minutes; or at about 160° C. for about 10 minutes.

4.7 Selected Applications of the Compound

Additionally, the inventors have described the use of the compositions described herein in a method selected from injection molding, transfer molding, casting, extrusion, overmolding, compression molding, and cavity molding. For example, the inventors have described a composition that is suitable for use in overmolding, such as liquid silicone overmolding. Overmolding, also known as two shot molding, is generally known as a process in which uncured silicone rubber is applied to a base material or substrate and formed to shape, while in direct contact with the substrate.

Additionally, the inventors have described compositions that when cured, simultaneously possess the desirable physical properties for use in Chip Scale Package, which is generally known as a type of integrated circuit package. According to IPC's standard J-STD-012, Implementation of Flip Chip and Chip Scale Technology, in order to qualify as chip scale, the package must have an area no greater than 1.2 times that of the die and it must be a single-die, direct surface mountable package. Another criterion that is often applied to qualify these packages as CSPs is their ball pitch should be no more than 1 mm. Moreover, the die may be mounted on an interposer upon which pads or balls are formed, like with flip chip ball grid array (BGA) packaging, or the pads may be etched or printed directly onto the silicon wafer, resulting in a package very close to the size of the silicon die: such a package is called a wafer-level package (WLP) or a wafer-level chip-scale package (WL-CSP). Because the compositions, when cured, simultaneously possesses a set of physical properties well suited for Chip Scale Package, a person of ordinary skill in the art can readily use the disclosures provided herein for application in a Chip Scale Package.

The example that follow illustrate exemplary embodiments without limiting the scope of the application.

Example 1

Experimental Results

Various formulations of the compositions described herein were made, their products of these formulations produced, and their physical properties measured. Table 1 represents an exemplary set of these results. In Table 1, each formulation is denoted as "F0" to "F16" and the physical properties of each composition, including viscosity, hardness, adhesion and transparency, were measured.

For viscosity, the dynamic viscosity of each composition was measured with spindle 6 at 10 rpm speed at 23° C. by a Brookfield viscometer (Model DV2TRVTJ0).

For hardness, a 6 mm thick sample of each composition was cured at 160° C. for 10 min and the hardness of the product was measured at 23° C. by the type A durometer by ASTM D2240.

For transparency, a 1 mm thick sample of each composition was cured at 120° C. for 30 min and then 160° C. for 10 min. The amount of 450 nm light transmitted was then measured at 23° C. using a UV-vis spectrophotometer (model UV2600, manufactured by Shimadzu Co. Ltd). Alternatively, the sample can be cured at 160° C. for 10 min and then the transmission properties measured.

For adhesion, a 1-2 mm thick sample from each composition was (a) poured onto a testing surface (for example, glass or aluminum) that is pre-cleaned by alcohol and blown dry by nitrogen gas to remove any alcohol residue, (b) cured on the testing surface at 160° C. for 10 min, and (c) underwent a peel test. For the peel test, attempts to peel the cured product from the testing surface was made at 45° angle at 23° C. and the amount of cured product can be completely peeled was quantified. For example:

the formulation was "OK" if 0-10% of the coated area could be completely peeled, the formulation was "OK-poor" if 10%-50% of the coated area could be completely peeled, the formulation was "Poor" if more than 50% of the coated area could be completely peeled, and the formulation was "No" if 100% of the coated area could be completely peeled (i.e. no adhesion)

TABLE 1

Compositions and their Properties. At least one example of each Formulation is provided as follows: Formulation I (e.g.: F0, F1, F3, F6-F8, and F14-F16); Formulation II (e.g.: F9); Formulation III (e.g.: F10); Formulation IV (e.g.: F0); Formulation V (e.g.: F1); Formulation VI (e.g.: F9); Formulation VII (e.g.: F3); and Formulation VIII (e.g.: F16). F0 is missing adhesion promoter D, and accordingly has poor adhesion. F2 is missing cyclic organopolysiloxane A3, and accordingly has lower hardness. F4 has too much A3, and accordingly has low transmission. F5 has too low of a SiH/SiVI molar ratio, and accordingly has lower hardness. F11/F12/F13 has less than 60% of MMviQ on the total amount of resin, and accordingly has low hardness. F15 has high adhesion promoter D1, and accordingly has low transmittance.

| | | | F0 | F1 | F2 | F3 | F4 | F5 | F6 | F7 | F8 | F9 |
|---|---|---|---|---|---|---|---|---|---|---|---|---|
| Components | | | | | | | | | | | | |
| A | A1 | α1 | 40 g | 40 g | 40 g | 40 g | 40 g | 40 g | 40 g | 40 g | 40 g | 35.2 g |
| | | α2 | 20 g | 20 g | 20 g | 20 g | 20 g | 20 g | 20 g | 20 g | 20 g | 24.8 g |
| | A2 | MM$^{Vi}$Q | 40 g | 40 g | 40 g | 40 g | 40 g | 40 g | 40 g | 40 g | 40 g | 35.2 g |
| | | MD$^{Vi}$Q | — | — | — | — | — | — | — | — | — | 4.8 g |
| | A3 | α3 | 3.78 g | 3.78 g | — | 5.36 g | 8.15 g | 3.67 g | 3.87 g | 4.07 g | 2.36 g | 3.77 g |
| B | | β1 | 16.13 g | 16.13 g | 7.73 g | 19.57 g | 25.77 g | 12.76 g | 18.97 g | 25.09 g | 12.74 g | 15.77 g |
| C | | γ1 | 0.004 g | 0.004 g | 0.004 g | 0.004 g | 0.005 g | 0.004 g | 0.004 g | 0.005 g | 0.004 g | 0.004 g |
| D | D1 | δ1 | — | 0.54 g | 0.49 g | 0.56 g | 0.60 g | 0.52 g | 0.55 g | 0.58 g | 0.52 g | 0.54 g |
| | | δ2 | — | — | — | — | — | — | — | — | — | — |
| | D2 | δ3 | — | 0.05 g | 0.05 g | 0.06 g | 0.06 g | 0.05 g | 0.06 g | 0.06 g | 0.05 g | 0.05 g |
| molar ratio of SiH (B):vinyl (A) | | | 1.7 | 1.7 | 1.7 | 1.7 | 1.7 | 1.4 | 2.0 | 2.6 | 1.7 | 1.7 |

TABLE 1-continued

Compositions and their Properties. At least one example of each Formulation is provided as follows: Formulation I (e.g.: F0, F1, F3, F6-F8, and F14-F16); Formulation II (e.g.: F9); Formulation III (e.g.: F10); Formulation IV (e.g.: F0); Formulation V (e.g.: F1); Formulation VI (e.g.: F9); Formulation VII (e.g.: F3); and Formulation VIII (e.g.: F16). F0 is missing adhesion promoter D, and accordingly has poor adhesion. F2 is missing cyclic organopolysiloxane A3, and accordingly has lower hardness. F4 has too much A3, and accordingly has low transmission. F5 has too low of a SiH/SiVI molar ratio, and accordingly has lower hardness. F11/F12/F13 has less than 60% of MMviQ on the total amount of resin, and accordingly has low hardness. F15 has high adhesion promoter D1, and accordingly has low transmittance.

Test Results

| | | | | | | | | | | |
|---|---|---|---|---|---|---|---|---|---|---|
| Viscosity (mPa·s) | Spindle 6, 10 rpm | 5800 | 5000 | 12600 | 3900 | 2800 | 6000 | 4700 | 3700 | 7000 | 6600 |
| Hardness (Shore-A) | 160° C. at 10 min | 79 | 78 | 69 | 82 | 85 | 68 | 84 | 82 | 79 | 79 |
| glass | 160° C. at 10 min | poor | OK | no | OK | OK | OK | OK | OK | OK | OK |
| Aluminium | 160° C. at 10 min | no | OK | no | OK | OK | OK | OK | OK | OK | OK |
| Transmission@ 450 nm | 120° C. 30 min then 160° C. | 92.2% | 90.7% | 91.1% | 89.3% | 74.6% | 91.0% | 91.2% | 90.6% | 91.8% | 90.8% |

| | | | | F10 | F11 | F12 | F13 | F14 | F15 | F16 |
|---|---|---|---|---|---|---|---|---|---|---|
| Components | | | | | | | | | | |
| A | A1 | α1 | | 27.95 g | 22.33 g | 10.38 g | — | 40 g | 40 g | 40 g |
| | | α2 | | 32.05 g | 37.67 g | 49.62 g | 60 g | 20 g | 20 g | 20 g |
| | A2 | MM$^{Vi}$Q | | 27.94 g | 22.33 g | 10.38 g | — | 40 g | 40 g | 40 g |
| | | MD$^{Vi}$Q | | 12.06 g | 17.67 g | 29.62 g | 40 g | — | — | — |
| | A3 | α3 | | 3.75 g | 3.74 g | 3.71 g | 3.69 g | 3.85 g | 3.92 g | 3.93 g |
| B | | β1 | | 15.31 g | 14.95 g | 14.13 g | 13.47 g | 15.77 g | 15.35 g | 16.45 g |
| C | | γ1 | | 0.004 g | 0.004 g | 0.004 g | 0.004 g | 0.004 g | 0.004 g | 0.004 g |
| D | D1 | δ1 | | 0.54 g | 0.54 g | 0.53 g | 0.53 g | 2.9 g | 5.7 g | 0.56 g |
| | | δ2 | | — | — | — | — | — | — | 4.37 g |
| | D2 | δ3 | | 0.05 g | 0.05 g | 0.05 g | 0.05 g | 0.05 g | 0.05 g | — |
| molar ratio of SiH (B):vinyl (A) | | | | 1.7 | 1.7 | 1.7 | 1.7 | 1.7 | 1.6 | 1.7 |
| Test Results | | | | | | | | | | |
| Viscosity (mPa·s) | Spindle 6, 10 rpm | | | 8000 | 10100 | 15200 | 21300 | 5000 | 4800 | 4400 |
| Hardness (Shore-A) | 160° C. at 10 min | | | 79 | 72 | 72 | 70 | 78 | 76 | 80 |
| glass | 160° C. at 10 min | | | OK | OK | OK | OK | ok | OK | OK |
| Aluminium | 160° C. at 10 min | | | OK | OK | OK | OK | ok | OK | OK |
| Transmission@ 450 nm | 120° C. 30 min then 160° C. | | | 91.9% | 91.3% | 93.5% | 93.1% | 89.7% | 82% | 92.9% |

5. REFERENCES

The following publications, references, patents and patent applications are hereby incorporated by reference in their entireties.

Bahadur, M., Nelson, R., Strong, M., (2010) Silicone Composition for Producing Transparent Silicone Materials and Optical Devices. WO 2010/138221 A1.
a. WO 2010/138221 A1 (2010)
Takanashi, M., Kobayashi, H., (2013) Curable Organopolysiloxane Composition. U.S. Pat. No. 8,389,650 B2.
a. U.S. Pat. No. 8,389,650 B2
Jia, L., Man, Z., (2016) Curable Polysiloxane Composition. WO 2016/107533 A1.
a. WO 2016/107533 A1
Jia, L., Man, Z., (2016) Curable Polysiloxane Composition. CN 105802238A.
a. CN 105802238 A
Cray, S., Habimana, J., Rich, D., Thibaut, M., (2010) Silicone Release Coating Compositions. US 2010/0255205 A1.
a. US 2010/0255205 A1

The invention claimed is:

1. A curable organopolysiloxane composition X comprising:
   (a1) one or more linear organopolysiloxane A1 containing at least two alkenyl groups having 2 to 6 carbon atoms bonded to a silicon atom;
   (a2) one or more organopolysiloxane resin A2 comprising at least one resin of formula MM$^{Vi}$Q, consisting essentially of the following units:
      (i) one or more monovalent siloxane unit M$^{Vi}$ with the formula 4.1(x) R'R$_2$SiO$_{1/2}$ and the chemical structure

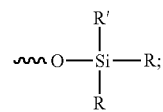

(ii) one or more monovalent siloxane unit M with the formula 4.1(ix) $R_3SiO_{1/2}$ and the chemical structure

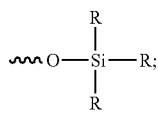

and
(iii) one or more tetravalent siloxane unit Q with the formula 4.1(xii) $SiO_{4/2}$ and the chemical structure:

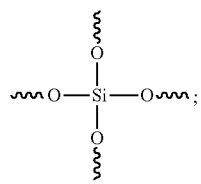

wherein, R denotes a monovalent hydrocarbon group having 1 to 6 carbon atoms and R' denotes a vinyl group,
  (a3) one or more cyclic organopolysiloxane A3 consisting of R'RSiO units organized in a cyclic structure, wherein the R' as used in this formula denotes an alkenyl group having 2 to 6 carbon atoms, optionally a vinyl group, and the R as used in this formula denotes a alkyl group having 1 to 6 linear or branched carbon atoms;
  (b) one or more organopolysiloxane crosslinker B comprising at least two and optionally at least three SiH groups, wherein SiH means a siloxyl or silyl group or unit, wherein at least one hydrogen is covalently bonded to an silicon atom
  (c) an effective amount of one or more polyaddition catalysts C, optionally a complex and/or compound with platinum; and
  (d) one or more adhesion promoter D1 and optionally a polycondensation catalyst D2, wherein the adhesion promoter D1 is:
    (i) the reaction product of (A) a fluid organopolysiloxane containing at least one alkenyl group having at least 2 to 6 carbon atoms, and at least one silanol group with (B) a hydrolysable silane containing at least one epoxide group having at least 4 to 10 carbon atoms, or
    (ii) the reaction product of (A) a fluid organopolysiloxane containing at least one alkenyl group having at least 2 to 6 carbon atoms and at least one silanol group with (B) a hydrolysable silane containing at least one epoxide group having at least 4 to 10 carbon atoms and D2 is tetrabutyltitanate, or
    (iii) an organopolysiloxane with one or more epoxide group having at least 4 to 10 carbon atoms,
  wherein the mass ratio of the organopolysiloxane resin A2 to the linear organopolysiloxane A1 is selected from the group consisting of from about 0.4 to about 1; from about 0.6 to about 0.8; and about 0.6 to about 0.7,
  wherein the mass ratio of the cyclic organopolysiloxane A3 to the sum of the organopolysiloxane A1 and organopolysiloxane resin A2 is from about $1.5\times10^{-2}$ to about $7\times10^{-2}$;
  wherein the molar ratio of the number of hydrogen atoms linked to a silicon atom to the total number of alkenyl unsaturation in the composition is from about 1.5 to about 4;

the curable organopolysiloxane composition X has a hardness after curing of above about 75 shore A; and wherein the composition X is completely or substantially free of any fillers.

2. The curable organopolysiloxane composition X of claim 1, wherein the cyclic organopolysiloxane A3 is a methylvinylpolysiloxane.

3. The curable organopolysiloxane composition X of claim 1, wherein the cyclic organopolysiloxane A3 is tetramethyltetravinylcyclotetrasiloxane.

4. The curable organopolysiloxane composition X of claim 1, wherein the organopolysiloxane crosslinker B is a branched or network organopolysiloxane.

5. The curable organopolysiloxane composition X of claim 1, wherein the organopolysiloxane crosslinker B is a M'Q resin with the formula 4.1(ii) $Si(O(CH_3)_2SiH)_4$.

6. The curable organopolysiloxane composition X of claim 1, further comprising one or more organopolysiloxane resin A2 of formula $MD^{Vi}Q$, consisting essentially of the following units:
  (a) one or more divalent siloxane unit $D^{Vi}$ with the formula 4.1(vii) $RR'SiO_{2/2}$ and the chemical structure

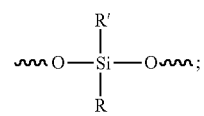

(b) one or more monovalent siloxane unit M with the formula 4.1(ix) $R_3SiO_{1/2}$ and the chemical structure

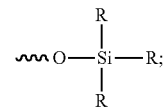

and
  (c) one or more tetravalent siloxane unit Q with the formula 4.1(xii) $SiO_{4/2}$ and the chemical structure:

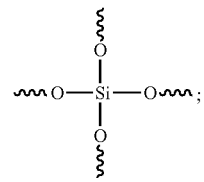

wherein, as used in these formulas, R denotes a monovalent hydrocarbon group having 1 to 6 carbon atoms and R' as denotes a vinyl group.

7. The curable organopolysiloxane composition X of claim 1, wherein amount of $MM^{Vi}Q$ resin is at least 60% by weight of total amount of organopolysiloxane resins A2.

8. The curable organopolysiloxane composition X of claim 1, wherein the linear organopolysiloxane A1 has a dynamic viscosity selected from the group consisting of from about 10 mPa.s to about 200,000 mPa.s, from about 200 mPa.s to about 100,000 mPa.s; and from about 3,000 mPa.s to about 70,000 mPa.s.

9. The curable organopolysiloxane composition X of claim 1, wherein the molar ratio of the number of hydrogen atoms linked to a silicon atom to the total number of alkenyl unsaturation in the composition is selected from the group consisting of from about 1.5 to about 3, and from about 1.5 to about 2.7.

10. The curable organopolysiloxane composition X of claim 1, wherein: the composition has a mass ratio of an adhesion promoter D1 to the sum of the linear organopolysiloxane A1 and organopolysiloxane resin A2 that is selected from the group consisting of from about $0.01 \times 10^{-2}$ to about $10 \times 10^{-2}$; from about $0.1 \times 10^{-2}$ to about $5 \times 10^{-2}$, and from about $0.3 \times 10^{-2}$ to about $4 \times 10^{-2}$.

11. The curable organopolysiloxane composition X of claim 1, wherein the mass ratio of the cyclic organopolysiloxane A3 to the sum of the organosiloxane A and the organopolysiloxane resin A2 is from about $2 \times 10^{-2}$ to about $6 \times 10^{-2}$.

12. The curable organopolysiloxane composition X of claim 1, wherein the total amount of D1 is selected from the group consisting of below about 4.5% weight of the total composition, below about 2.4% weight of the total composition, and below about 1% weight of the total composition.

13. A cured product obtained by curing the curable organopolysiloxane composition of claim 1.

14. The cured product of claim 13, wherein the transparency of the cured composition is selected from the group consisting of above about 88% transmission at about 450 nm, above about 90% transmission at about 450 nm and above about 92% transmission at about 450 nm.

15. The cured product of claim 13, wherein the product has a hardness of from about 75 to about 80 shore A.

16. The cured product of claim 13, wherein the cured product has a hardness of from about 80 to about 90 shore A.

17. The curable organopolysiloxane composition X of claim 1, wherein the composition has a curing speed from about 10 minutes to about 20 minutes at from about 150° C. to about 170° C.

18. The curable organopolysiloxane composition X of claim 1, wherein the composition has a curing speed of about 10 minutes at about 160° C.

19. The cured product of claim 13, wherein the product is a sealing material for an optical device.

20. The cured product of claim 19, wherein the optical device is a light emitting diode.

21. An optical device comprising the cured product of claim 13.

22. A method of curing the curable composition of claim 1, wherein the composition is cured in a method selected from the group consisting of injection molding, transfer molding, casting, extrusion, overmolding, compression molding, and cavity molding.

23. A method of making an optical device, the method comprising incorporating the cured product of claim 13 into the optical device, wherein the optical device is selected from the group consisting of one or more of the following:
   a charged coupled device,
   a light emitting diode,
   a light guide,
   an optical camera,
   a photo-coupler,
   a waveguide, and
   combinations thereof.

24. The cured product of claim 13, wherein the cured product is provided in a Chip Scale Package.

25. A curable organopolysiloxane composition X comprising:
   (a1) one or more linear organopolysiloxane A1 containing at least two alkenyl groups having 2 to 6 carbon atoms bonded to a silicon atom;
   (a2) one or more organopolysiloxane resin A2 comprising at least one resin of formula MM$^{Vi}$Q, consisting essentially of the following units:
      (i) one or more monovalent siloxane unit M$^{Vi}$ with the formula 4.1(x) R'R$_2$SiO$_{1/2}$ and the chemical structure

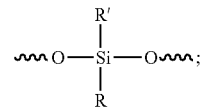

(ii) one or more monovalent siloxane unit M with the formula 4.1(ix) R$_3$SiO$_{1/2}$ and the chemical structure

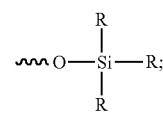

and
      (iii) one or more tetravalent siloxane unit Q with the formula 4.1(xii) SiO$_{4/2}$ and the chemical structure:

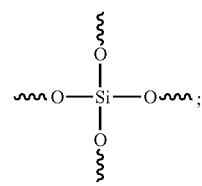

wherein, R denotes a monovalent hydrocarbon group having 1 to 6 carbon atoms and R' denotes a vinyl group,
   (a3) one or more cyclic organopolysiloxane A3 consisting of R'RSiO units organized in a cyclic structure, wherein the R' as used in this formula denotes an alkenyl group having 2 to 6 carbon atoms, optionally a vinyl group, and the R as used in this formula denotes a alkyl group having 1 to 6 linear or branched carbon atoms;
   (b) one or more organopolysiloxane crosslinker B comprising at least two and optionally at least three SiH groups, wherein SiH means a siloxyl or silyl group or unit, wherein at least one hydrogen is covalently bonded to an silicon atom; and
   (c) an effective amount of one or more polyaddition catalysts C, optionally a complex and/or compound with platinum;
   (d) one or more adhesion promoter D1 and optionally a polycondensation catalyst D2, wherein the adhesion promoter D1 is:
      (i) the reaction product of (A) a fluid organopolysiloxane containing at least one alkenyl group having at least 2 to 6 carbon atoms, and at least one silanol group with (B) a hydrolysable silane containing at least one epoxide group having at least 4 to 10 carbon atoms, or
      (ii) the reaction product of (A) a fluid organopolysiloxane containing at least one alkenyl group having at least 2 to 6 carbon atoms and at least one silanol group with (B) a hydrolysable silane containing at least one epoxide group having at least 4 to 10 carbon atoms and D2 is tetrabutyltitanate, or (iii) an organopolysiloxane with one or more epoxide group having at least 4 to 10 carbon atoms, wherein the mass ratio of the organopolysiloxane resin A2 to the linear organopolysiloxane A1 is selected from the group consisting of from about 0.4 to about 1; from about 0.6 to about 0.8; and about 0.6 to about 0.7, wherein the mass ratio of the cyclic organopolysiloxane A3 to the sum of the organopolysiloxane A1 and organopolysiloxane resin A2 is from about $1.5 \times 10^{-2}$ to about $7 \times 10^{-2}$;

wherein the molar ratio of the number of hydrogen atoms linked to a silicon atom to the total number of alkenyl unsaturation in the composition is from about 1.5 to about 4;

wherein the curable organopolysiloxane composition X has a hardness after curing of above about 75 shore A; and wherein upon curing, the transparency of the cured composition is selected from the group consisting of above about 88% transmission at about 450 nm, above about 90% transmission at about 450 nm and above about 92% transmission at about 450 nm.

26. The curable organopolysiloxane composition X of claim 25, wherein the cyclic organopolysiloxane A3 is a methylvinylpolysiloxane.

27. The curable organopolysiloxane composition X of claim 25, wherein the cyclic organopolysiloxane A3 is tetramethyltetravinylcyclotetrasiloxane.

28. The curable organopolysiloxane composition X of claim 25, wherein the organopolysiloxane crosslinker B is a branched or network organopolysiloxane.

29. The curable organopolysiloxane composition X of claim 25, wherein the organopolysiloxane crosslinker B is a M'Q resin with the formula 4.1(ii) $Si(O(CH_3)_2SiH)_4$.

30. The curable organopolysiloxane composition X of claim 25, further comprising one or more organopolysiloxane resin A2 of formula $MD^{Vi}Q$, consisting essentially of the following units:

(a) one or more divalent siloxane unit $D^{Vi}$ with the formula 4.1(vii) $RR'SiO_{2/2}$ and the chemical structure

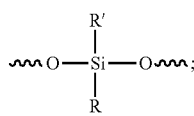

(b) one or more monovalent siloxane unit M with the formula 4.1(ix) $R_3SiO_{1/2}$ and the chemical structure

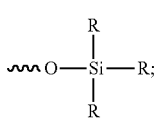

and
(c) one or more tetravalent siloxane unit Q with the formula 4.1(xii) $SiO_{4/2}$ and the chemical structure:

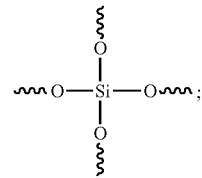

wherein, R denotes a monovalent hydrocarbon group having 1 to 6 carbon atoms and R' as denotes a vinyl group.

31. The curable organopolysiloxane composition X of claim 25, wherein amount of $MM^{Vi}Q$ resin is at least 60% by weight of total amount of organopolysiloxane resins A2.

32. The curable organopolysiloxane composition X of claim 25, wherein the linear organopolysiloxane A1 has a dynamic viscosity selected from the group consisting of from about 10 mPa.s to about 200,000 mPa.s, from about 200 mPa.s to about 100,000 mPa.s; and from about 3,000 mPa.s to about 70,000 mPa.s.

33. The curable organopolysiloxane composition X of claim 25, wherein the molar ratio of the number of hydrogen atoms linked to a silicon atom to the total number of alkenyl unsaturation in the composition is selected from the group consisting of from about 1.5 to about 3, and from about 1.5 to about 2.7.

34. The curable organopolysiloxane composition X of claim 25, wherein: the composition has a mass ratio of an adhesion promoter D1 to the sum of the linear organopolysiloxane A1 and organopolysiloxane resin A2 that is selected from the group consisting of from about $0.01 \times 10^{-2}$ to about $10 \times 10^{-2}$; from about $0.1 \times 10^{-2}$ to about $5 \times 10^{-2}$, and from about $0.3 \times 10^{-2}$ to $4 \times 10^{-2}$.

35. The curable organopolysiloxane composition X of claim 25, wherein the mass ratio of the cyclic organopolysiloxane A3 to the sum of the organosiloxane A1 and the organopolysiloxane resin A2 is from about $2 \times 10^{-2}$ to about $6 \times 10^{-2}$.

36. The curable organopolysiloxane composition X of claim 25, wherein the total amount of D1 is selected from the group consisting of below about 4.5% weight of the total composition, below about 2.4% weight of the total composition, and below about 1% weight of the total composition.

37. The curable organopolysiloxane composition X of claim 25, wherein the composition X is completely or substantially free of any fillers.

38. A cured product obtained by curing the curable organopolysiloxane composition of claim 25.

39. The cured product of claim 38, wherein the cured product has a hardness of from about 75 to about 80 shore A.

40. The cured product of claim 38, wherein the cured product has a hardness of from about 80 to about 90 shore A.

41. The curable organopolysiloxane composition X of claim 25, wherein the composition has a curing speed from about 10 minutes to about 20 minutes at from about 150° C. to about 170° C.

42. The curable organopolysiloxane composition X of claim 25, wherein the composition has a curing speed of about 10 minutes at about 160° C.

43. The cured product of claim 38, wherein the product is a sealing material for an optical device.

44. The cured product of claim 43, wherein the optical device is a light emitting diode.

45. An optical device comprising the cured product of claim 38.

46. A method of curing the curable composition of claim 25, wherein the composition is cured in a method selected from the group consisting of injection molding, transfer molding, casting, extrusion, overmolding, compression molding, and cavity molding.

47. A method of making an optical device, the method comprising incorporating the cured product of claim 38 into the optical device, wherein the optical device is selected from the group consisting of one or more of the following:
- a charged coupled device,
- a light emitting diode,
- a light guide,
- an optical camera,
- a photo-coupler,
- a waveguide, and
- combinations thereof.

48. The cured product of claim 38, wherein the cured product is provided in a Chip Scale Package.

* * * * *